UNITED STATES PATENT OFFICE.

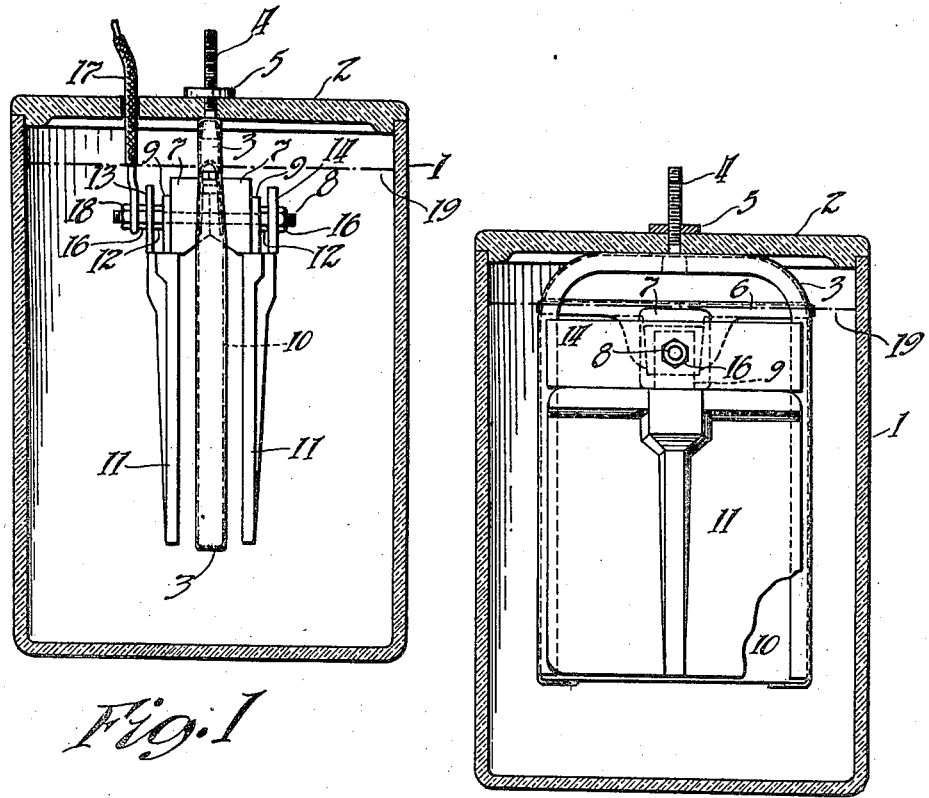
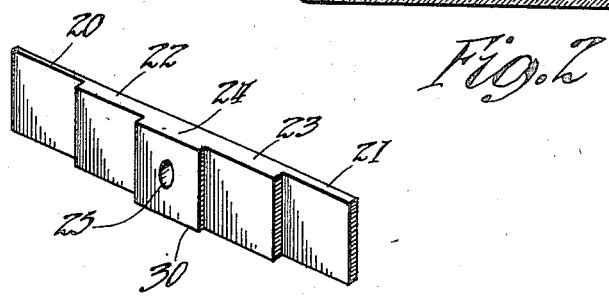

WILLIAM M. SHAKESPEARE, OF SOUTH ORANGE, NEW JERSEY, ASSIGNOR TO NEW JERSEY PATENT COMPANY, OF WEST ORANGE, NEW JERSEY, A CORPORATION OF NEW JERSEY.

PRIMARY BATTERY.

1,407,489.  Specification of Letters Patent.  Patented Feb. 21, 1922.

Application filed May 6, 1920. Serial No. 379,403.

*To all whom it may concern:*

Be it known that I, WILLIAM M. SHAKESPEARE, a citizen of the United States, and a resident of South Orange, Essex County, New Jersey, have invented certain new and useful Improvements in Primary Batteries, of which the following is a description.

My invention relates to primary batteries, being in some aspects an improvement on the inventions disclosed in Patent No. 1,061,541 granted May 13, 1913 to Hudson and Elmes, and in Patent No. 1,138,363, granted May 4, 1913, to Elmes, and the principal object thereof is to provide such batteries with improved means designed to give a more accurate indication or measure, at any time, of the amount of energy that has been expended and the amount of energy still available, as well as to give a more accurate advance indication of the approaching exhaustion or consumption of the positive electrode elements of such batteries in order that such elements may, if desired, be removed and replaced at the proper time.

Other features of my invention will be hereinafter more fully described and claimed.

My invention is designed particularly for that class of primary batteries in which the negative electrode consists of an element or elements of oxid of copper or other depolarizing agent and the positive electrode consists of an element or elements of zinc. In accordance with the invention disclosed in Patents Nos. 1,061,541 and 1,138,363, mentioned above, the zinc positive elements for batteries of this type are provided with portions or panels of reduced and varying thickness whereby the appearance of perforations in such portions or panels, as the elements are consumed during the action of the cell, serves as the means for indicating the energy expenditure of the cells or the extent of consumption of the positive elements and also the approaching exhaustion or substantially complete consumption of the positive elements. This means of indication is objectionable for the following reasons:

1. In order to obtain indications which are at all accurate by this means, it is necessary that the corresponding reduced portions or panels of like positive zinc elements should be made of uniform thickness. As these zinc positive elements are molded, this is extremely difficult due to the fact that in successive castings zinc oxide builds upon the mold faces. In this connection it is noted that the point in the operation of the discharge of a primary battery cell provided with a zinc positive element at which the perforations will appear in such element, will, other things being equal, vary directly as the thickness of such element.

2. Zinc of different crystalline structure or amalgamation appears to be consumed under electrolytic action, at different rates. Consequently as it is very difficult at the present time to control the crystalline structure of cast zinc, from which the positive elements of batteries of this type are made, the rate at which these elements are consumed and, therefore, the points in the operation of these batteries at which perforations appear in the reduced portions or panels provided in such elements in accordance with the inventions of the two patents above mentioned, doubtless vary greatly.

3. In the majority of batteries of this character the battery elements are secured together, as by means of a supporting bolt, only at the upper end thereof, and consequently in such batteries the element assembly is somewhat flexible and the distances between the negative elements and the adjacent positive zinc elements vary to a considerable degree in different cells. This, it is believed, will result in the reduced indicating portions or panels provided in zinc elements in accordance with the inventions of the two patents mentioned, being consumed at different rates in different cells.

My invention resides in the provision of indicating means in a primary battery whereby all of the foregoing objections are practically obviated; and more specifically described, the invention consists in providing a primary battery cell with indicating means preferably separate and distinct from the battery electrodes and preferably mounted in fixed relation to the negative electrode. Preferably this indicating means consists of a strip of rolled zinc, which is much more uniform in structure than cast zinc and which may readily be made of practically uniform thickness. This indicator strip is mounted in fixed relation to the negative electrode of the cell as by being secured in fixed position on the zinc element supporting bolt usually employed in batteries of this type and which is carried by the negative electrode. In case several different indications of the energy consumption are desired, a plurality of such indicating strips of different thicknesses may be employed in a given cell or a single strip having portions of different thicknesses may be used, which strips or portions may, if desired, be suitably marked to denote the amount of energy necessary to be expended to substantially completely consume the same.

In order that my invention may be more clearly understood, attention is directed to the drawing accompanying and forming a part of this specification and in which:

Figure 1 is a central vertical sectional view, partly in elevation, of a primary battery cell provided with indicating means in acordance with my invention;

Fig. 2 is a view similar to Fig. 1 but at right angles thereto; and

Fig. 3 is an enlarged view in perspective of a modified form of indicator element which may be employed in place of the indicator elements shown in Figs. 1 and 2.

Referring to the drawing, and especially to Figs. 1 and 2 thereof, reference character 1 represents an ordinary battery jar or container, preferably of glass, provided with the usual cover 2, also preferably formed of glass or other insulating material such as porcelain. Reference character 3 represents a hanger or frame for carrying the negative oxid of copper plate 10, and preferably constructed of a strip or sheet of copper or copper-plated iron or steel. The hanger 3 is preferably in the form of an inverted U as is usual, and is supported from the cover 2 in any suitable manner as by a bolt or screw-threaded rod 4 suitably secured thereto and extending through an aperture provided therefor in the cover, and a nut 5 threaded on the rod. A cross-bar 6, secured at its ends to the arms of the hanger 3 bears on the top of the negative plate 10. Insulating blocks 7, preferably formed of porcelain, are provided with reduced inner end portions disposed in recesses or notches provided therefor in the upper end portion of the negative plate 10 and in the cross-bar 6. The usual zinc positive plates 11, 11 are respectively disposed at opposite sides of the negative copper oxid plate 10 in spaced relation thereto, these zinc plates being supported by a bolt or rod 8 carried by the insulating blocks 7, this bolt or rod extending through the insulating blocks 7 and through lugs 9, 9 respectively secured to and extending upwardly from the zinc plates 11, 11. The parts are rigidly secured together with the zinc plates 11, 11 spaced and insulated from the negative copper oxid plate 10, by means of nuts 12, 12 threaded on the rod 8 and turned up tightly against the outer faces of the lugs 9, 9. A pair of flat strips 13 and 14, preferably formed of rolled zinc, are respectively mounted on the end portions of the bolt 8 and securely fastened thereon in fixed spaced relation to the negative plate 10 between the nuts 12 and nuts 16, the latter being turned up tightly against these strips. Each of these strips 13, 14 is preferably of uniform thickness, but one of the strips, 14, is considerably thicker than the other strip, 13. Each of these strips is also preferably rectangular in shape and of such size that the lower edge thereof will engage the top edge of the adjacent positive plate 11 whereby such strip will be prevented from turning on the bolt 8. The bolt or threaded rod 4 constitutes one terminal of the cell, it being electrically connected with the negative plate 10. The other terminal of the cell, as shown, consists of a conductor 17 extending through an aperture provided therefor in the cover 2 and secured to the rod 8, which is electrically connected to both of the positive plates 11, 11, between one of the nuts 16 and another nut 18 threaded on this rod.

The electrolyte 19 in which the battery elements are immersed is a caustic alkaline solution, preferably a solution of sodium hydroxide, and the level thereof is maintained at a point above the negative plate 10 and the positive plates 11, 11 and also above the rolled zinc strips 13 and 14. It will therefore be apparent that the strips 13 and 14, which as described above are secured in fixed spaced relation to the negative plate 10, will be subjected to the electrolytic or electro-chemical action of the cell. Moreover, these strips will be constantly consumed at a uniform rate when the cell is in operation, and will be substantially completely consumed at predetermined extents of consumption of the positive plates 11, 11. The thinner strip 13 is preferably of such a thickness that it will be substantially completely consumed when the positive plates 11, 11 have been one-half consumed, that is, after the expenditure of approximately one-half the energy at which the cell is rated; while the strip 14 is of such thickness that it will be substantially completely consumed only slightly in advance of the positive zinc plates 11, 11, thus giving an advance indication of the exhaustion of the cell.

Instead of using a plurality of strips of different thickness for the purpose of giving indications of the condition of the cell, I may employ a single strip having portions of different thickness. Such a strip 30 is shown in Fig. 3. This strip 30 is preferably rectangular in shape and is adapted to be mounted on the bolt 8 of the cell shown in Figs. 1 and 2 in place of one of the strips 13 and 14, in which case the other of these strips is omitted. The strip 30 is provided with a plurality of stepped portions 20, 21, 22 and 23 which are of increasing thickness in the order mentioned and with a central portion 24 thicker than the portion 23. The central portion 24 is provided with an aperture 25 for the reception of the bolt 8. It will be apparent that when the strip 30 is employed, each of the portions 20, 21, 22 and 23 thereof will be substantially completely consumed after different and predetermined extents of consumption of the positive plates 11, 11 or after different and predetermined amounts of energy have been expended, whereby several indications of the extent of consumption of the positive plates and the approximate amount of energy expended and that still available will be obtained during the discharge of the cell. The portion 23 is made of such thickness that it will be substantially completely consumed at the same time as the positive plates 11, 11 and when the cell is nearly exhausted, thus giving an advance indication of the approaching exhaustion of the cell.

It is to be understood that the embodiments of my invention specifically shown and described herein are subject to numerous changes and modifications without departure from the spirit of the invention and the scope of the appended claims.

Having now described my invention, what I claim as new and desire to protect by Letters Patent of the United States, is as follows:

1. In a primary cell, an electrode consumable in the operation of the cell, and an indicating element also consumable in the operation of the cell, the extent of consumption of said indicating element during the operation of the cell having a predetermined relation to the extent of consumption of said consumable electrode, substantially as described.

2. In a primary cell, an electrode consumable in the operation of the cell, an electrode of opposite polarity thereto, and an indicating element consumable in the operation of the cell in predetermined spaced relation to said electrode of opposite polarity, substantially as described.

3. In a primary cell, a pair of electrodes of opposite polarities, one of said electrodes being consumable through the electro-chemical action of the cell, an indicating element also consumable through the electro-chemical action of the cell, said element being so spaced from the other of said electrodes and having a portion of such thickness that such portion will be substantially consumed at a predetermined extent of consumption of said consumable electrode, substantially as described.

4. In a primary cell, an electrode consumable in the operation of the cell, an electrode of opposite polarity thereto, and means for indicating the extent of consumption of said consumable electrode comprising material consumable in the operation of the cell, said material being spaced from said electrode of opposite polarity and having portions of different thicknesses, substantially as described.

5. In a primary cell, electrolyte, a pair of electrodes therein, one of said electrodes being consumable, and means for indicating the extent of consumption thereof comprising a consumable element insulated from the other of said electrodes and fixed at a predetermined distance therefrom and immersed in said electrolyte and in electrical connection with said consumable electrode, substantially as described.

6. In a primary cell, the combination with a copper oxide negative electrode and a zinc positive electrode, of an element composed of rolled zinc, said element being mounted in the cell so as to be subjected to the electrolytic action thereof, whereby the condition of such element serves as an indication of the expenditure, substantially as described.

7. In a primary cell, the combination with the positive and negative electrodes and supporting means rigidly connecting the electrodes in insulated spaced relation, of an element formed of material which is consumable under the electrolytic action of the cell applied to said supporting means in insulated spaced relation to the negative electrode, substantially as described.

This specification signed and witnessed this 3rd day of May, 1920.

WILLIAM M. SHAKESPEARE.

Witnesses:
　GEORGE P. NEWMAN,
　WILLIAM A. HARDY.